(12) United States Patent
Beaurepaire et al.

(10) Patent No.: US 11,015,937 B2
(45) Date of Patent: May 25, 2021

(54) METHOD AND SYSTEM FOR GUIDING USERS IN A PARKING FACILITY

(71) Applicant: HERE GLOBAL B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 357 days.

(21) Appl. No.: 16/034,205

(22) Filed: Jul. 12, 2018

(65) Prior Publication Data

US 2020/0018602 A1  Jan. 16, 2020

(51) Int. Cl.
*G01C 21/00* (2006.01)
*G01C 21/20* (2006.01)
(Continued)

(52) U.S. Cl.
CPC ....... *G01C 21/206* (2013.01); *G01C 21/3461* (2013.01); *G01C 21/3685* (2013.01); *G01C 21/3691* (2013.01)

(58) Field of Classification Search
CPC ............. G01C 21/206; G01C 21/3691; G01C 21/3685; G01C 21/3461; G01C 21/3453;
(Continued)

(56) References Cited

U.S. PATENT DOCUMENTS

| | | | | |
|---|---|---|---|---|
| 6,542,811 B2* | 4/2003 | Doi | ........................ | G01C 21/20 |
| | | | | 701/429 |
| 9,368,032 B1* | 6/2016 | Sheikh | ................... | G08G 1/205 |

(Continued)

FOREIGN PATENT DOCUMENTS

| | | |
|---|---|---|
| CN | 107301787 A | 10/2017 |
| JP | 2005003526 A | 1/2005 |
| KR | 100798658 B1 | 1/2008 |

OTHER PUBLICATIONS

Han et al., "Optimization Design and Evaluation of Parking Route Based on Automatic Assignment Mechanism of Parking Lot", Sage Journals, Advances in Mechanical Engineering, vol. 9, Issue 7, published Jul. 1, 2017, retrieved from http://journals.sagepub.com/doi/pdf/10.1177/1687814017712416, p. 1-9.

*Primary Examiner* — Shardul D Patel
(74) *Attorney, Agent, or Firm* — Ditthavong, Steiner & Mlotkowski

(57) ABSTRACT

A method, system, and computer program product for managing a parking facility, and specifically generating dynamic paths to guide a user in a parking facility is provided. The method comprises identifying an access point in the parking facility suitable to be utilized by the user. The method further comprises receiving data related to one or more of vacant parking spots and navigable gaps between parked vehicles in the parking facility. The method further comprises determining a path to be traversed by the user for reaching the access point, wherein the determined path, when traversed, comprises navigating through one or more of the vacant parking spots and the navigable gaps between parked vehicles. The method further comprises sharing the determined path with the user via a user interface. The method further comprises instructing vehicles in the parking facility to park leaving gaps at least equal to a threshold distance.

20 Claims, 9 Drawing Sheets

(51) Int. Cl.
*G01C 21/36* (2006.01)
*G01C 21/34* (2006.01)

(58) Field of Classification Search
CPC ............... G01C 21/00; G08G 1/09685; G08G 1/096866; G08G 1/0969; G08G 1/146; G08G 1/143; G08G 1/096827; G01S 13/89; G01S 17/89; B60W 30/06; B62D 15/0285
USPC .................. 701/400, 409, 423, 533; 340/989
See application file for complete search history.

(56) References Cited

U.S. PATENT DOCUMENTS

| | | | |
|---|---|---|---|
| 2009/0005969 A1* | 1/2009 | Tamura | G01C 21/3423 701/533 |
| 2013/0030702 A1* | 1/2013 | Yamamoto | G01C 21/3685 701/533 |
| 2013/0144471 A1* | 6/2013 | Min | B60W 40/00 701/2 |
| 2014/0336920 A1* | 11/2014 | Burrell | G01C 21/206 701/409 |
| 2016/0117866 A1* | 4/2016 | Stancato | H04L 51/32 705/5 |
| 2016/0153789 A1* | 6/2016 | Gallar | G01C 21/3635 701/408 |
| 2018/0087922 A1* | 3/2018 | Wu | G09B 29/007 |
| 2018/0181095 A1* | 6/2018 | Funk | H04L 67/12 |
| 2019/0063947 A1* | 2/2019 | Beaurepaire | G01C 21/3476 |
| 2019/0360837 A1* | 11/2019 | Matsumoto | G09B 29/10 |

\* cited by examiner

METHOD AND SYSTEM FOR GUIDING USERS IN A PARKING FACILITY

TECHNOLOGICAL FIELD

The present disclosure generally relates to a system and method for guiding a user in an indoor environment, and more particularly relates to a system and method for generating dynamic paths to guide a user, such as a pedestrian in an indoor environment like a parking facility.

BACKGROUND

Urban car ownership has reached unprecedented levels. Common places or venues which people often visit, like offices, shopping malls, movie theatres, etc. provide parking facilities for parking of users' vehicles. Generally, in such venues, the parking facilities are often quite large and confusing for a person to move in. Location-based services may include providing an indication of parking availability to a user while they are searching for a vacant parking spot in the parking facility. However, most often, parking in a parking facility (e.g., a parking lot or a parking garage) is not the final destination for a user. The parking facility is typically a location close to where the user's final destination is located, though parking proximity and ease of access to a final destination can vary widely in a parking lot or a parking garage, particularly in large parking facilities with multiple floors and pedestrian routes. Due to unpredictability of vacant parking spots, people generally tend to park their vehicles at first available vacant parking spots. This may result in the person having to traverse on foot a large distance between the parking spot of the vehicle and access point from where the person could reach his/her final destination in the venue.

BRIEF SUMMARY

In light of the above discussed problems, there is a need to provide means for better utilization of parking resources, and particularly to provide the user with a safe and quick path between the parking spot and the access point, in the parking facility.

In one aspect, a method for guiding a user in a parking facility is provided. The method comprises identifying an access point in the parking facility suitable to be utilized by the user. The method further comprises receiving data related to one or more of vacant parking spots and navigable gaps between parked vehicles in the parking facility. The method further comprises determining a path to be traversed by the user for reaching the access point, wherein the determined path, when traversed, comprises navigating through one or more of the vacant parking spots and the navigable gaps between parked vehicles. The method further comprises sharing the determined path with the user via a user interface.

In one or more embodiments, identifying the access point comprises receiving information about a final destination of the user; and determining the access point suitable to be utilized by the user for reaching the final destination from the parking facility.

In one or more embodiments, the method further comprises identifying the one or more access points based, at least in part, on user defined preferences for types of pedestrian access.

In one or more embodiments, the one or more access points is a pedestrian access comprising at least one of: one or more stairs, an elevator, an escalator, a moving walkway, an accessible ramp, or an access controlled portal.

In one or more embodiments, the method further comprises selecting a suitable vacant parking spot for a vehicle of the user from the vacant parking spots, wherein the suitable vacant parking spot is the vacant parking closest to the access point.

In one or more embodiments, the method further comprises providing the vehicle of the user with one or more sensors configured to determine empty spaces proximal thereto; and determining a route to be traversed by the vehicle of the user in the parking facility for reaching the selected suitable vacant parking spot such that the vehicle traverses through the parking facility in order to collect required data related to one or more of vacant parking spots and navigable gaps between parked vehicles, wherein the determined route is not the most direct route.

In one or more embodiments, the method further comprises determining a probability of one or more vacant parking spots in the determined path to remain vacant for a period of time, wherein the period of time is based, at least in part, on approximate time to be taken by the user for traversing the determined path.

In one or more embodiments, the probability of one or more vacant parking spots in the determined path to remain vacant for a period of time is based on the flow of vehicles through one or more entries and exits of the parking facility.

In one or more embodiments, the probability of one or more vacant parking spots in the determined path to remain vacant for a period of time is based on the number and locations of vehicles in the parking facility trying to park in one or more vacant parking spots.

In one or more embodiments, the navigable gaps comprise gaps at least equal to a threshold distance between parked vehicles in the parking facility, and wherein the threshold distance is equal to minimum space required for the user to egress therethrough.

In one or more embodiments, the method further comprises instructing one or more vehicles in the parking facility to park so as to leave gaps therebetween, such that the gaps are at least equal to the threshold distance in order to be utilized as navigable gaps.

In another aspect, a system for guiding a user in a parking facility is provided. The system comprises at least one processor and at least one non-transitory memory including computer program code instructions, the computer program code instructions configured to, when executed, cause the system to at least identify an access point in the parking facility suitable to be utilized by the user; receive data related to one or more of vacant parking spots and navigable gaps between parked vehicles in the parking facility; determine a path to be traversed by the user for reaching the access point, wherein the determined path, when traversed, comprises navigating through one or more of the vacant parking spots and the navigable gaps between parked vehicles; and share the determined path with the user via a user interface.

In one or more embodiments, identifying the access point comprises receiving information about a final destination of the user; and determining the access point suitable to be utilized by the user for reaching the final destination from the parking facility.

In one or more embodiments, the access point is a pedestrian access comprising at least one of: one or more stairs, an elevator, an escalator, a moving walkway, an accessible ramp, or an access controlled portal.

In one or more embodiments, identifying the access point is based, at least in part, on user defined preferences for types of pedestrian access.

In one or more embodiments, the system is further caused to select a suitable vacant parking spot for a vehicle of the user from the vacant parking spots, wherein the suitable vacant parking spot is the vacant parking spot closest the access point.

In one or more embodiments, receiving data related to one or more of vacant parking spots and navigable gaps between parked vehicles comprises providing the vehicle of the user with one or more sensors configured to determine empty spaces proximal thereto; and determining a route to be traversed by the vehicle of the user in the parking facility for reaching the selected suitable vacant parking spot such that the vehicle traverses through the parking facility in order to collect required data related to one or more of vacant parking spots and navigable gaps between parked vehicles, wherein the determined route is not the most direct route.

In one or more embodiments, the system is further caused to determine a probability of one or more vacant parking spots in the determined path to remain vacant for a period of time, wherein the period of time is based, at least in part, on approximate time to be taken by the user for traversing the determined path.

In one or more embodiments, the probability of one or more vacant parking spots in the determined path to remain vacant for a period of time is based on the flow of vehicles through one or more entries and exits of the parking facility.

In one or more embodiments, the probability of one or more vacant parking spots in the determined path to remain vacant for a period of time is based on the number and locations of vehicles in the parking facility trying to park in one or more vacant parking spots.

In one or more embodiments, the navigable gaps comprise gaps at least equal to a threshold distance between parked vehicles in the parking facility, and wherein the threshold distance is equal to minimum space required for the user to egress therethrough.

In one or more embodiments, the system is further caused to instruct one or more vehicles in the parking facility to park so as to leave gaps therebetween, such that the gaps are at least equal to the threshold distance in order to be utilized as navigable gaps.

In one or more embodiments, the user interface is at least one of a display screen in the vehicle of the user, a smartphone of the user, an audio device and a display screen in the parking facility.

In yet another aspect, a computer program product is provided. The computer program product comprises at least one non-transitory computer-readable storage medium having computer-executable program code instructions stored therein. The computer-executable program code instructions comprising program code instructions to identify an access point in a parking facility suitable to be utilized by a user; receive data related to one or more of vacant parking spots and navigable gaps between parked vehicles in the parking facility; determine a path to be traversed by the user for reaching the access point, wherein the determined path, when traversed, comprises navigating through one or more of the vacant parking spots and the navigable gaps between parked vehicles; and share the determined path with the user via a user interface.

In one or more embodiments, the computer program product further comprises program code instructions to select a suitable vacant parking spot for a vehicle of the user from the vacant parking spots, wherein the suitable vacant parking spot is the vacant parking spot closest to the access point.

In one or more embodiments, the computer program product further comprises program code instructions to determine a route to be traversed by the vehicle of the user in the parking facility for reaching the selected suitable vacant parking spot such that the vehicle, equipped with one or more sensors configured to determine empty spaces proximal thereto, traverses through the parking facility in order to collect required data related to one or more of vacant parking spots and navigable gaps between parked vehicles, wherein the determined route is not the most direct route.

In one or more embodiments, the computer program product further comprises program code instructions to determine a probability of one or more vacant parking spots in the determined path to remain vacant for a period of time, wherein the period of time is based, at least in part, on approximate time to be taken by the user for traversing the determined path.

In one or more embodiments, the computer program product further comprises program code instructions to instruct one or more vehicles in the parking facility to park so as to leave gaps therebetween, such that the gaps are at least equal to a threshold distance in order to be utilized as navigable gaps, wherein the threshold distance is equal to minimum space required for the user to egress therethrough.

In still another aspect, a method for managing a parking facility is provided. The method comprises receiving data related to navigable gaps between parked vehicles in the parking facility. The method further comprises determining if number of navigable gaps in the parking facility is below a predefined first margin. The method further comprises determining if distribution of navigable gaps in the parking facility is below a predefined second margin. The method further comprises instructing one or more vehicles in the parking facility to park leaving gaps at least equal to a threshold distance, in case one or more of the number of navigable gaps in the parking facility is below the predefined first margin and if distribution of navigable gaps in the parking facility is below the predefined second margin.

In one or more embodiments, the threshold distance is equal to minimum space required for the user to egress therethrough.

In one or more embodiments, the method further comprises installing one or more sensors in the parking facility, wherein the one or more sensors are configured to identify navigable gaps in the parking facility.

In one or more embodiments, the method further comprises providing a vehicle with one or more sensors configured to identify vacant parking spots and navigable gaps proximal thereto; determining a route to be traversed by the vehicle in the parking facility to maximize collection of the data related to navigable gaps between parked vehicles; and traversing the vehicle on the determined route.

In one or more embodiments, instructing one or more vehicles comprises instructing one or more autonomous vehicles to park close to one of edges of corresponding parking spot.

In one or more embodiments, instructing one or more vehicles comprises instructing drivers of one or more vehicles to park close to one of edges of corresponding parking spot via a user interface.

In still another aspect, a method for managing a parking facility is provided. The method comprises determining a path to be traversed by a user to reach one or more access points in the parking facility, wherein the determined path, when traversed, comprises navigating through gaps between parked vehicles. The method further comprises determining, if in the determined path, one or more gaps have distance between parked vehicles smaller than a threshold distance. The method further comprises instructing one or more vehicles corresponding to the one or more gaps with smaller than a threshold distance to park leaving gaps at least equal to the threshold distance.

In still another aspect, a system for managing a parking facility is provided. The system comprising at least one processor and at least one non-transitory memory including computer program code instructions, the computer program code instructions configured to, when executed, cause the system to at least receive data related to navigable gaps between parked vehicles in the parking facility; determine if number of navigable gaps in the parking facility is below a predefined first margin; determine if distribution of navigable gaps in the parking facility is below a predefined second margin; and instruct one or more vehicles in the parking facility to park leaving gaps at least equal to a threshold distance, in case one or more of the number of navigable gaps in the parking facility is below the predefined first margin and if distribution of navigable gaps in the parking facility is below the predefined second margin.

In one or more embodiments, the threshold distance is equal to minimum space required for the user to egress therethrough.

In one or more embodiments, receiving data related to navigable gaps between parked vehicles comprises installing one or more sensors in the parking facility, wherein the one or more sensors are configured to identify navigable gaps in the parking facility.

In one or more embodiments, receiving data related to navigable gaps between parked vehicles comprises providing a vehicle with one or more sensors configured to identify vacant parking spots and navigable gaps proximal thereto; determining a route to be traversed by the vehicle in the parking facility to maximize collection of the data related to navigable gaps between parked vehicles; and traversing the vehicle on the determined route.

In one or more embodiments, the system is further caused to instruct one or more autonomous vehicles to park close to one of edges of corresponding parking spot.

In one or more embodiments, the system is further caused to instruct drivers of one or more vehicles to park close to one of edges of corresponding parking spot via a user interface.

In still another aspect, a computer program product is provided. The computer program product comprises at least one non-transitory computer-readable storage medium having computer-executable program code instructions stored therein. The computer-executable program code instructions comprising program code instructions to receive data related to navigable gaps between parked vehicles in a parking facility; determine if number of navigable gaps in the parking facility is below a predefined first margin; determine if distribution of navigable gaps in the parking facility is below a predefined second margin; and instruct one or more vehicles in the parking facility to park leaving gaps at least equal to a threshold distance, in case one or more of the number of navigable gaps in the parking facility is below the predefined first margin and if distribution of navigable gaps in the parking facility is below the predefined second margin.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
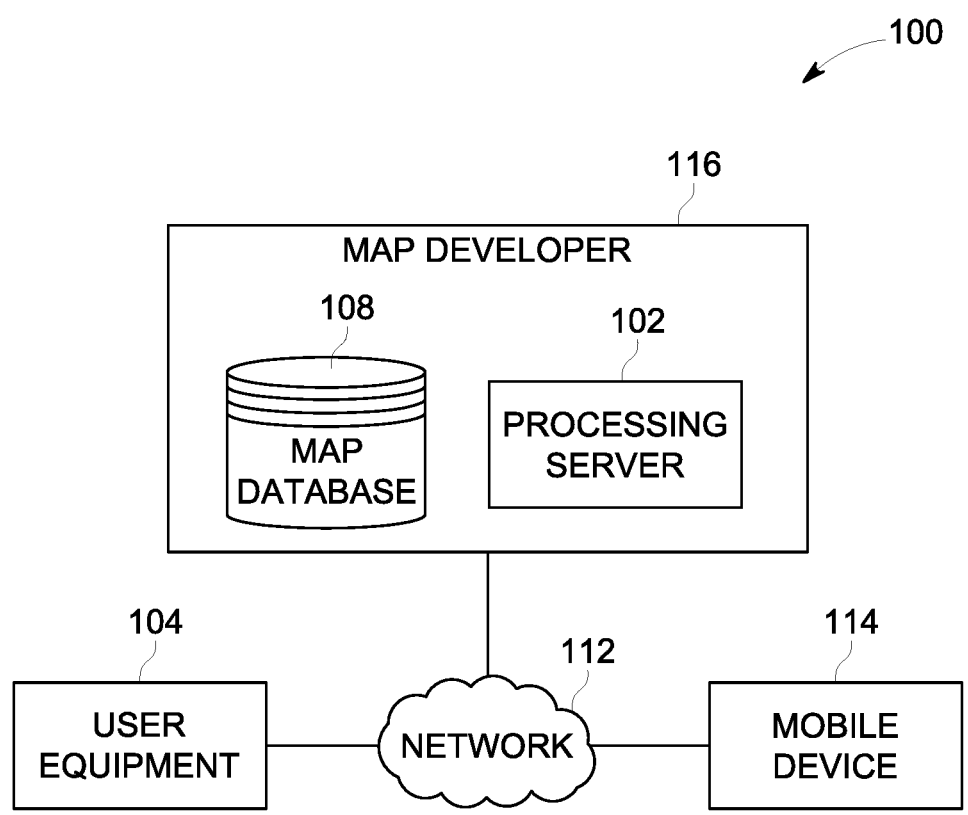
Figure 2:
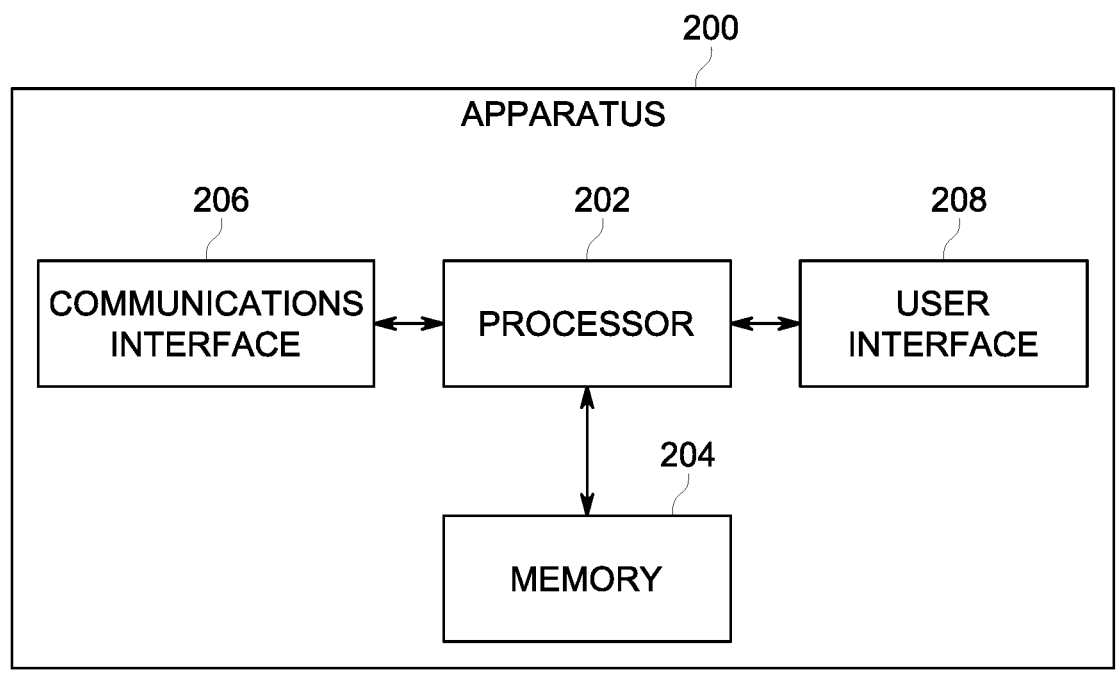
Figure 3:
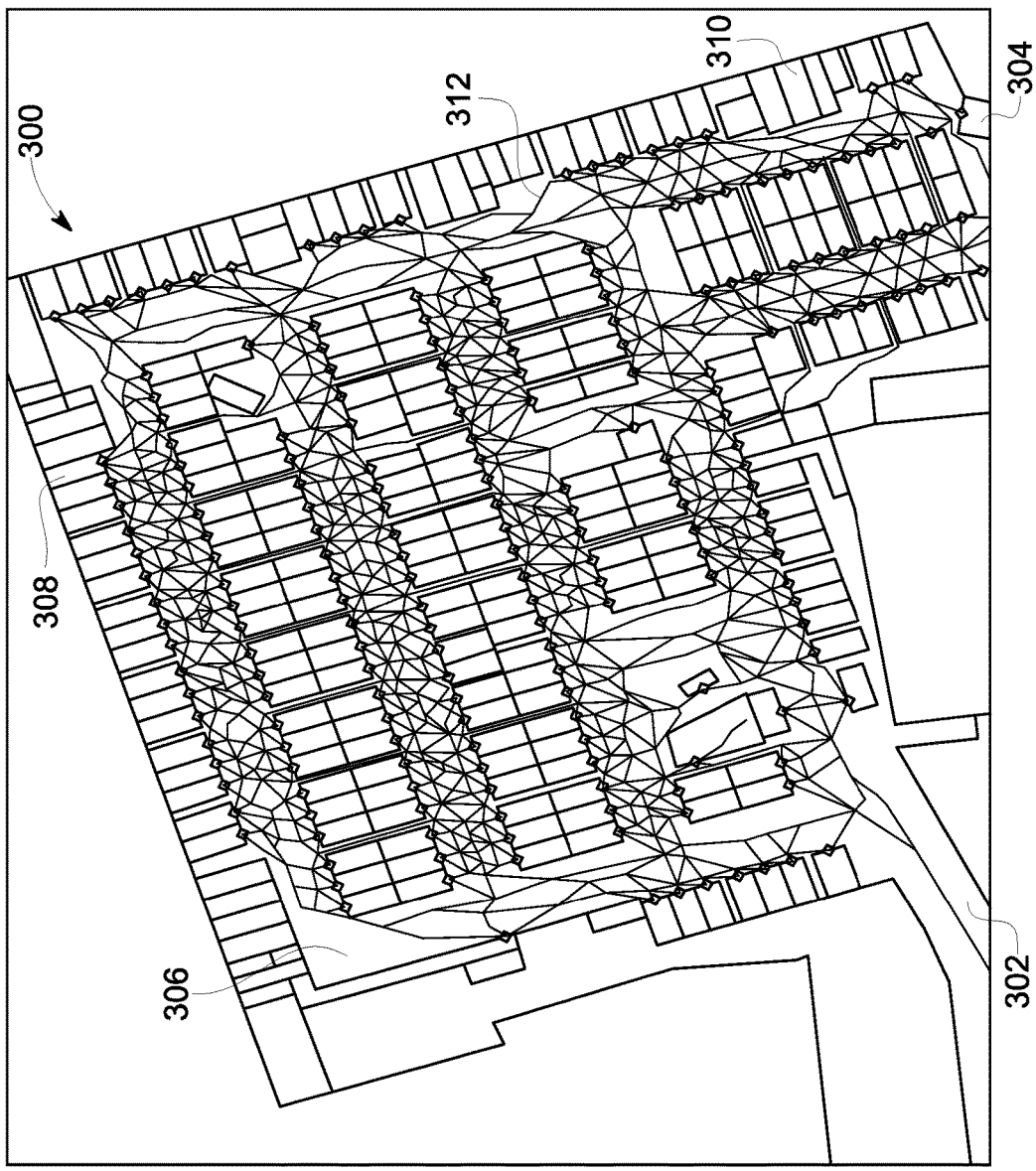
Figure 4:
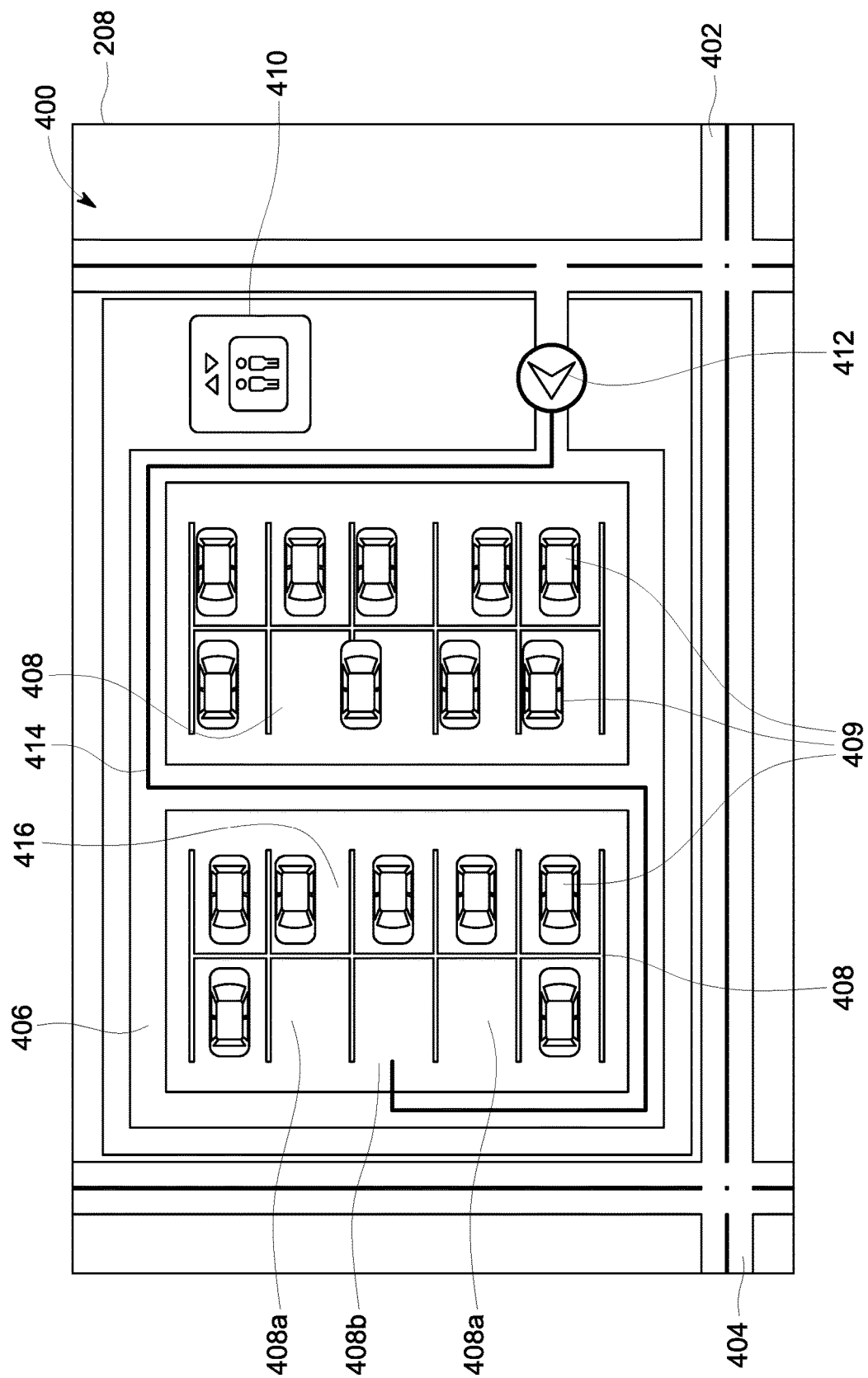
Figure 5:
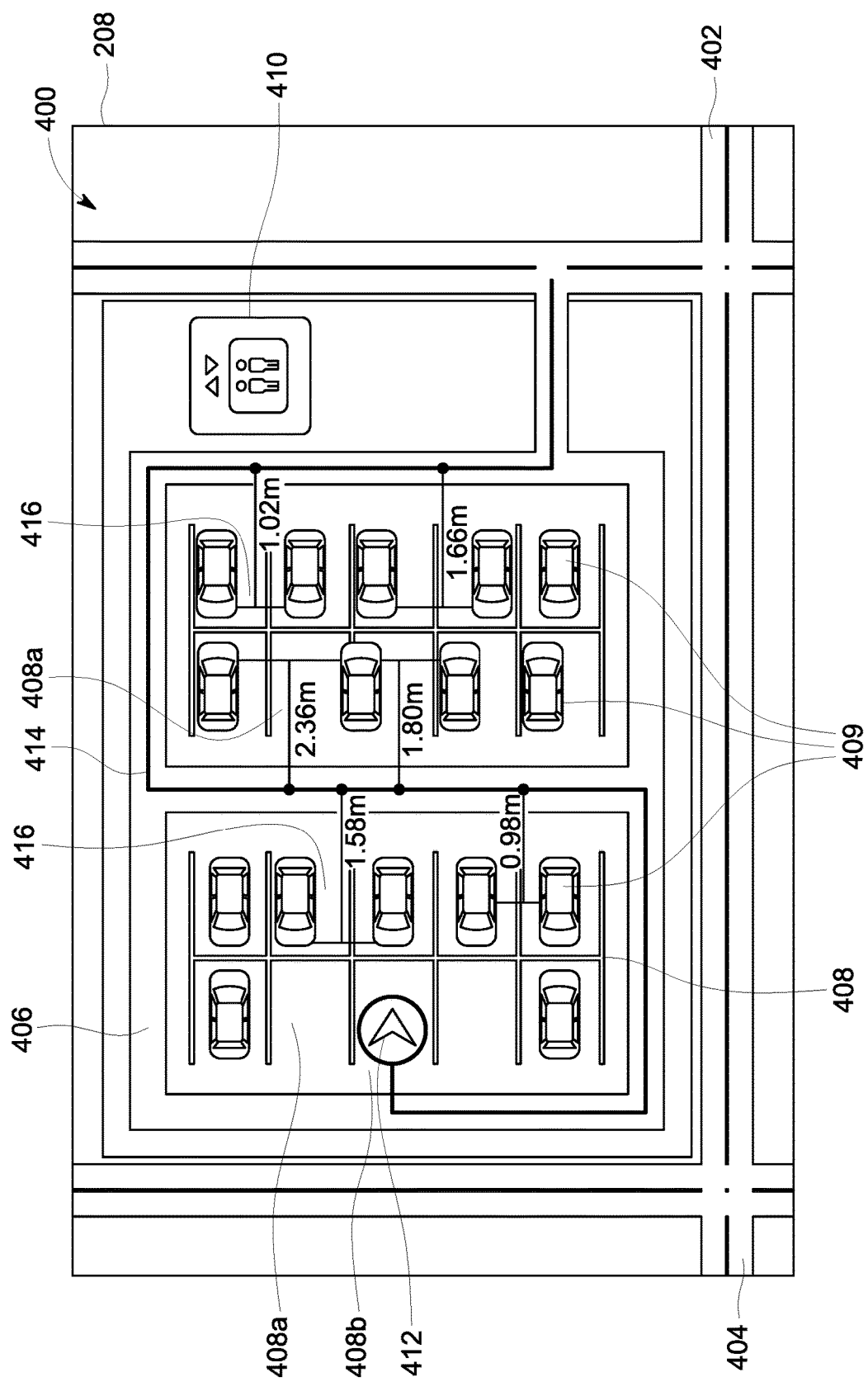
Figure 6:
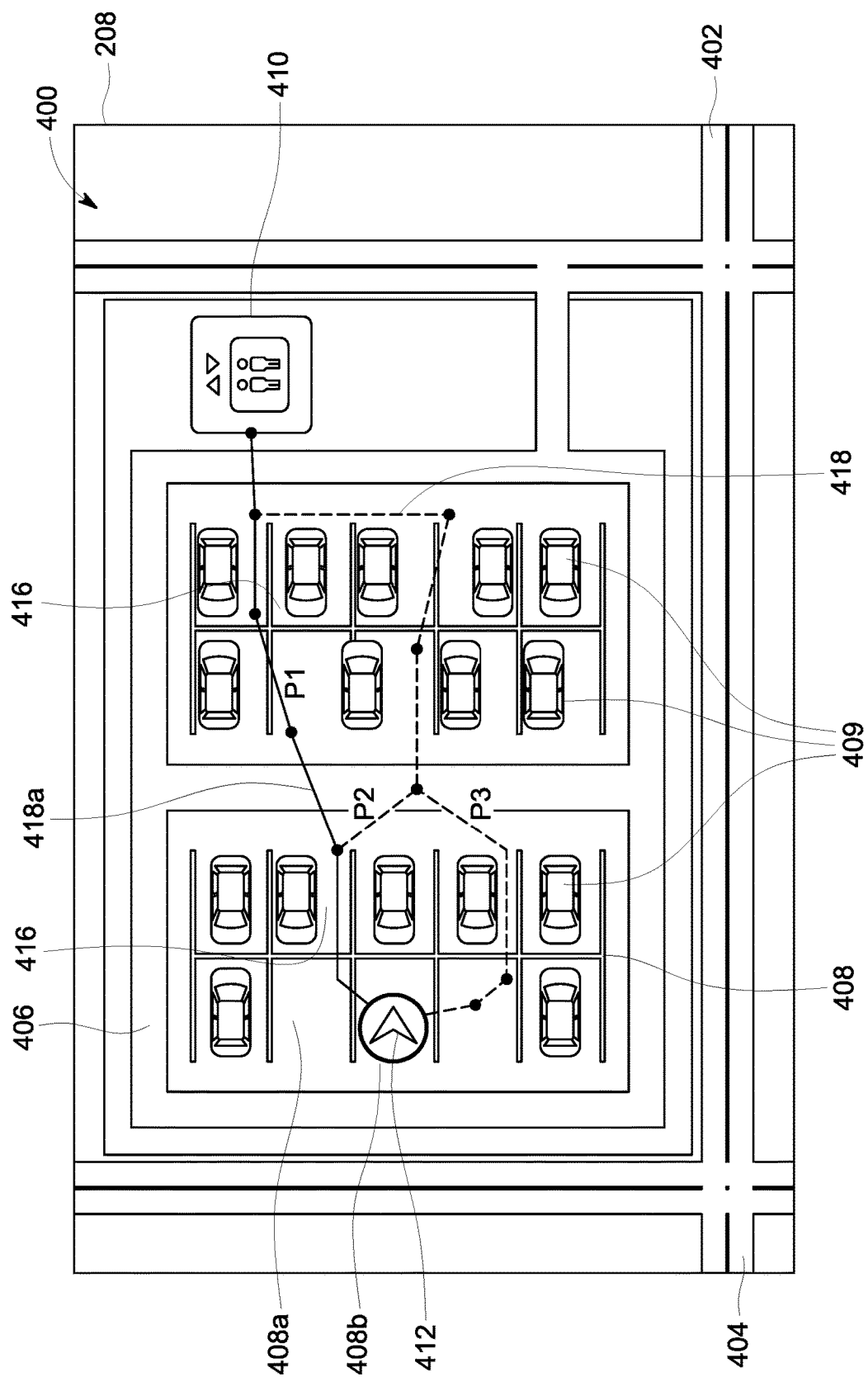
Figure 7:
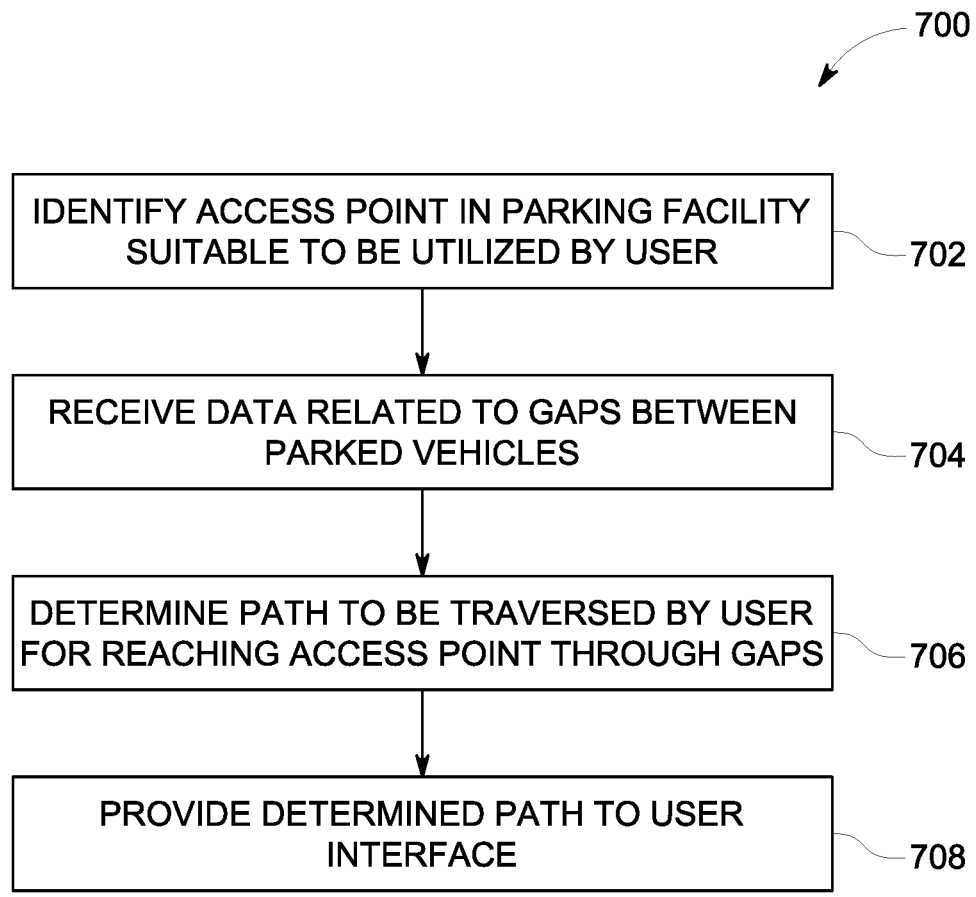
Figure 8:
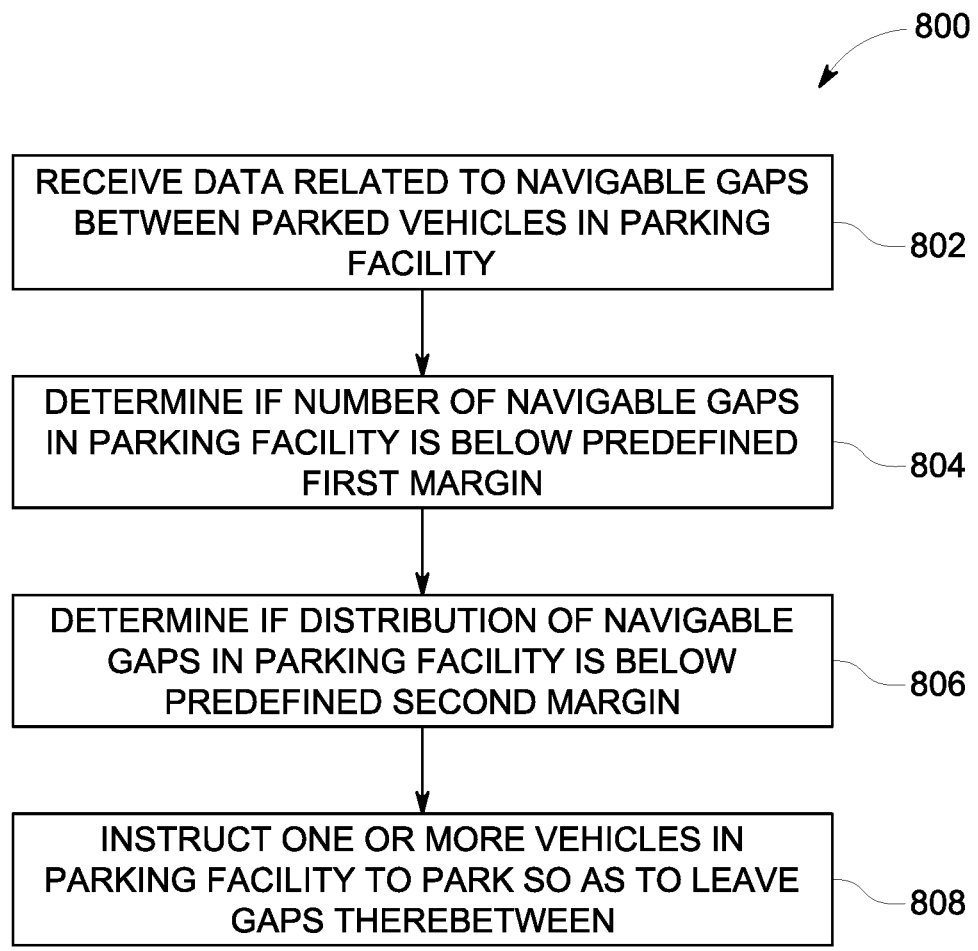
Figure 9:
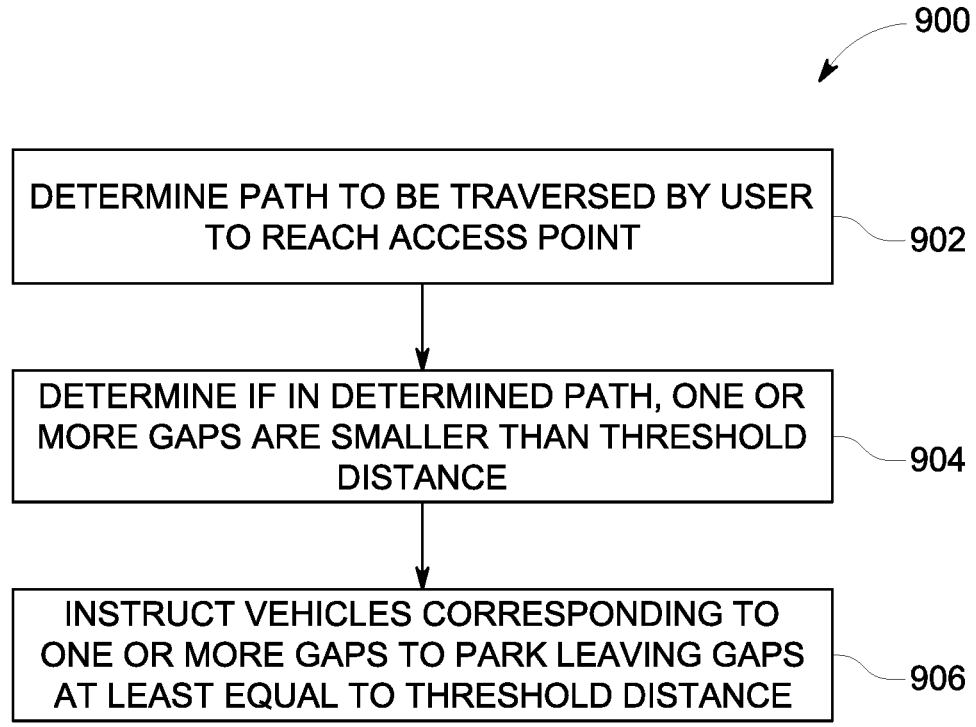

Having thus described example embodiments of the invention in general terms, reference will now be made to the accompanying drawings, which are not necessarily drawn to scale, and wherein:

FIG. 1 illustrates a schematic block diagram of a system configured for managing a parking facility, in accordance with an example embodiment;

FIG. 2 is a block diagram of an apparatus configured for guiding a user in a parking facility, in accordance with an example embodiment;

FIG. 3 depicts a user interface depicting navigation map of a typical parking structure with plurality of paths commonly taken by a user to reach an access point;

FIG. 4 depicts a user interface depicting a navigation map of a parking facility indicating a route for a vehicle to a suitable parking spot, in accordance with an example embodiment;

FIG. 5 depicts a user interface depicting a navigation map of a parking facility indicating found vacant parking spots and navigable gaps, in accordance with an example embodiment;

FIG. 6 depicts a user interface depicting a navigation map of a parking facility indicating a path to be traversed by the user for reaching the access point, in accordance with an example embodiment;

FIG. 7 illustrates a flowchart depicting a method for generating dynamic paths to guide a user in a parking facility, in accordance with an example embodiment;

FIG. 8 illustrates a flowchart depicting a method for managing a parking facility, in accordance with an example embodiment; and FIG. 9 illustrates a flowchart depicting a method for managing a parking facility, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Parking facilities, and in particular, indoor parking facilities or parking structures may be complex structures that require an increased cognitive load from a driver. The confined space, the driver focusing on finding a parking space while also navigating an unfamiliar pathway, the plurality of vehicles also focusing on finding a parking space within the confined space, and the vehicles attempting to exit the facility all contribute to a stressful environment that increases the cognitive load of a user navigating such an environment.

Finding a parking space can be time consuming and frustrating, particularly in parking facilities such as large parking lots or multi-level parking structures or parking garages where parking spaces may be limited and the orientation of a user relative to their final destination within the parking facility may not be readily apparent to the user. When a user, such as the driver of a vehicle, is guided to a destination via route guidance of a navigation system, for example, the final destination may lack parking at the immediate location, such as an attached parking lot or designated parking for the final destination. Such an example may include when a final destination is a store located within a shopping complex, such as a mall. The individual store may not have parking proximate the store, and parking for the shopping complex may be in a facility proximate the shopping complex. Similarly, a sporting event, concert, or the like may be at a particular location which is established as the final destination, while available parking for such an event may be in one or more parking structures around the venue hosting the event.

Historically, navigation systems (e.g., embedded car navigation systems) may offer assistance in these situations by indicating parking facilities (e.g., surface parking lots, parking garages, etc.) that are nearby. In each of the above-mentioned cases, navigation and route guidance for a vehicular portion of the trip may provide route guidance for a vehicle to a parking facility proximate the venue that is the final destination. Parking facilities can be large parking lots or parking structures with multiple pedestrian access points to allow a user to exit from the parking facility once their vehicle is parked. The user may not be aware of where the pedestrian access point(s) are relative to a parking space, the user may not be aware of the orientation of the parking facility to the final destination such that they do not know which region or floor/level within a parking facility is desirable for reaching the final destination, and the user may not be aware of the type of pedestrian access is provided at available pedestrian access points (e.g., stairs, elevators, access controlled doors, etc.). Due to unpredictability of vacant parking spots, people generally tend to park their vehicles at first available vacant parking spots. This may result in the person having to traverse on foot a large distance between the parking spot of the vehicle and access point from where the person could reach his/her final destination in the venue.

Moreover, many times, the user may choose to walk through the driving lanes in the parking facility to reach the desired access point. Due to lack of any pedestrian crossings in the parking facility, the drivers of the vehicles on the driving lanes do not know if there is a need to stop or slow down to let a person cross the driving lane. Thus, the act of walking through the driving lanes could prove to be dangerous, or even fatal in some cases.

A method, apparatus, and computer program product are provided herein in accordance with an example embodiment for guiding a user in a parking facility, and in particular for guiding a user in a parking facility by determining and generating one or more dynamic paths to be traversed by the user for reaching the access point. The determined path provides safe and quick route, and possibly shortest distance, for reaching a suitable access point, which is the pathway to the final destination of the user. Embodiments described herein reduce the cognitive load to a user by indicating a vacant parking spot proximate to a suitable access point for the user to reach his/her final destination with ease, and further providing indicating a path to be followed by the user to safely and conveniently reach the suitable access point from the parking spot of the vehicle of the user, in the parking facility.

In order to provide a way for better utilization of parking resources, a system as illustrated in FIG. 1 is provided. FIG. 1 illustrates an exemplary block diagram of the system 100 depicting the communication between its various components for implementing example embodiments described herein. The system (generally represent by the numeral 100) of the present disclosure is configured to dynamically determine one or more paths which minimize distance to be traversed by the user for reaching the access point from the parking spot and further ensure that the determined paths are safe to traverse in consideration of other vehicles moving in the parking facility. In particular, the system 100 is configured to generate dynamic paths to guide a user in a parking facility, where the dynamic paths at least include one safe path to be traversed by the user for reaching the access point in the parking facility.

As illustrated in the embodiment of FIG. 1, the system 100 includes a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The system 100 may include a map developer 116 may include computer systems and network of a system operator. The processing server 102 may implement the map database 108, for example, as a remote map server. The network may be wired, wireless, or any combination of wired and wireless communication networks, such as cellular, Wi-Fi, internet, local area networks, or the like.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

According to example embodiments described herein, the map database 108 may further include venue maps. Venue maps may be of a venue that is indoor, outdoor, or a combination thereof, and may include data regarding access points (pedestrian and/or vehicular), details regarding points of interest within the venue, data representing paths within the venue (pedestrian and/or vehicular), or the like. For example, a venue map may include a map of a shopping mall, and may include entrances/exits, store locations/ names, routes through the shopping mall, stairs/escalators/ elevators, restrooms, etc. A venue map may also include a parking facility which may be a parking garage, parking lot, or other parking structure, and may include maps of the levels of the parking facility, pedestrian access points to the parking facility for each level of the parking facility, the type of pedestrian access (stairs, elevator, controlled access door, accessible ramps, etc.). The map database 108 may further include data regarding parking spaces (e.g., parking space type: handicap, visitor, reserved, etc.) and locations within the parking facility, travel lanes within the parking facility, vehicle entrances/exits to the parking facility, parking space types (e.g., hybrid vehicle, plug-in vehicle, handicap vehicle, compact vehicle, oversize vehicle, etc.), ramps to access other levels, etc.

Venue maps may optionally include a radio map of the venue. Electromagnetic (EM) signals, particularly from short range communication systems, such as Wi-Fi, Bluetooth™, etc. can be recorded at different locations inside a venue, from which a radio coverage map can be derived. Such a map may provide radio positioning means to vehicles that can receive the short range communication signals as a tracking signal when positioning signals, such as GPS, are unavailable. Such radio positioning may also mitigate accumulated error that may be present in inertial measurement units, for example. Optionally, positioning within a venue may be performed via object or point-of-interest recognition, where objects referenced in a venue map may be identified by vehicle sensors. Such an embodiment may enable a vehicle to derive its position from the observations, which can be made by image sensors, light distancing and ranging (LiDAR), RADAR, or the like.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to parking space availability along different road segments of the map database, where a parking availability estimation may be generated in dependence of time of day, day of week, season of the year, special events, etc. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example. This may be of particular benefit when used for navigating within a parking facility. As many parking facilities are multi-level concrete and steel structures, network connectivity and global positioning satellite availability may be low or non-existent. In such cases, locally-stored data regarding the parking facility may be beneficial as navigation of the parking facility could be performed without requiring connection to a network or a positioning system. In such an embodiment, various other locating methods could be used to provide vehicle reference position within the parking facility, such as inertial measuring units, vehicle wheel sensors, compass, radio positioning means, etc.

In one embodiment, the end user device, i.e. the user equipment 104 can be an in-vehicle navigation system, such as an ADAS, a personal navigation device (PND), a portable navigation device, a cellular telephone, a smart phone, a personal digital assistant (PDA), a smart watch, a camera display, a computer such as a laptop computer, an audio device such as one or more speakers, and/or other device that can perform navigation-related functions, such as digital routing and map display. Additionally, or alternatively, the user equipment 104 may be a fixed computing device, such as a personal computer, computer workstation, kiosk, office terminal computer or system, or the like. Similarly, the processing server 102 may be one or more fixed or mobile computing devices. The user equipment 104 may be configured to access the map database 108 via the processing server 102 through, for example, a mapping application, such that the user equipment 104 may provide navigational assistance to a user among other services provided through access to the map developer 116. An end user can use the user equipment 104 for navigation and map functions such as guidance and map display, for example, and for determination of one or more personalized routes or route segments based on one or more calculated and recorded routes, according to some example embodiments.

An example embodiment of the user equipment 104 may be embodied in an apparatus as illustrated in FIG. 2. The apparatus 200, such as that shown in FIG. 2, may be specifically configured as part of the user equipment 104 for guiding a user in a parking facility. In other words, the apparatus 200 may be implemented for generating and/or sharing dynamic paths to guide a user in a parking facility. In some embodiments, the apparatus 200 may be embodied as a chip or chip set. The apparatus 200 may comprise one or more physical packages including materials, components and/or wires on a structural assembly, as required for its operation. The apparatus 200 may include or otherwise be in communication with a processor 202, a memory device 204, a communications interface 206, and a user interface 208. In some embodiments, the processor 202 (and/or co-processors or any other processing circuitry assisting or otherwise associated with the processor) may be in communication with the memory device 204 via a bus for passing information among components of the apparatus 200.

The memory device 204 may be non-transitory and may include, for example, one or more volatile and/or non-volatile memories. In other words, for example, the memory device 204 may be an electronic storage device (for example, a computer readable storage medium) comprising gates configured to store data (for example, bits) that may be retrievable by a machine (for example, a computing device like the processor 202). The memory device 204 may be configured to store information, data, content, applications, instructions, or the like, for enabling the apparatus to carry out various functions in accordance with an example embodiment of the present invention. For example, the memory device 204 could be configured to buffer input data for processing by the processor 202. Additionally, or alternatively, the memory device 204 could be configured to store instructions for execution by the processor 202.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Additionally, or alternatively, the processor 202 may be configured to execute hard coded functionality. As such, whether configured by hardware or software methods, or by a combination thereof, the processor 202 may represent an entity (for example, physically embodied in circuitry) capable of performing operations according to an embodiment of the present invention while configured accordingly. Thus, for example, when the processor 202 is embodied as an ASIC, FPGA or the like, the processor may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present invention by further configuration of the processor by instructions for performing the algorithms and/or operations described herein. The processor 202 may include, among other things, a clock, an arithmetic logic unit (ALU) and logic gates configured to support operation of the apparatus 200.

As noted earlier, the apparatus 200 of an example embodiment may also include the communications interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communications interface 206 may include, for example, an antenna (or multiple antennae) and supporting hardware and/or software for enabling communications with a wireless communication network. Additionally, or alternatively, the communications interface 206 may include the circuitry for interacting with the antenna(s) to cause transmission of signals via the antenna(s) or to handle receipt of signals received via the antenna(s). In some environments, the communications interface 206 may alternatively or also support wired communication. As such, for example, the communications interface 206 may include a communication modem and/or other hardware and/or software for supporting communication via cable, digital subscriber line (DSL), universal serial bus (USB) or other mechanisms.

Further, the user interface 208 may in turn be in communication with the processor 202 to provide output to the user and, in some embodiments, to receive an indication of a user input. As such, the user interface 208 may include a display, one or more speakers, or other output mechanisms. In one embodiment, the processor 202 may comprise user interface circuitry configured to control at least some functions of one or more user interface elements such as a display and, in some embodiments, a plurality of speakers, a ringer, one or more microphones and/or the like. The processor 202 and/or user interface circuitry comprising the processor may be configured to control one or more functions of one or more user interface elements through computer program instructions (for example, software and/or firmware) stored on a memory accessible to the processor (for example, memory device 204, and/or the like). In one or more embodiments, the user interface 208 is at least one of: a display screen in the vehicle of the user, a smartphone of the user, an audio device and a display screen in the parking facility. In the present embodiments, the user interface 208 is configured as a display.

In the system 100, the processing server 102 receives probe data from the mobile device 114. The mobile device 114 may include one or more detectors or sensors as a positioning system built or embedded into or within the interior of the mobile device 114. Alternatively, the mobile device 114 uses communication signals for position determination. The mobile device 114 may receive location data from a positioning system, such as a global positioning system (GPS), cellular tower location methods, access point communication fingerprinting, or the like. The processing server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. Optionally, certain locations, such as parking facilities, may have poor GPS reception, but may have wireless access stations or other signal providing/receiving means within the facility as described above. These access stations may provide wireless fingerprint data to a vehicle based on the vehicle position within the facility, where the location of the vehicle can be established based on the strength of various access point signals. This may provide accurate positioning of a vehicle within such a facility. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

In an embodiment of the present disclosure, the mobile device 114 is implemented as one or more sensors installed on the vehicle of the user. In such configurations, the mobile device 114 is configured to determine empty spaces proximal thereto. When a vehicle with such mobile device 114 traverses in a parking facility, the mobile device 114 may be able to find empty spaces corresponding to vacant parking spots. Further, the mobile device 114 may be able to find gaps between parked vehicles. For this purpose, the mobile device 114 may include one or more sensors, such as, but not limited to, RADAR, LIDAR, ultrasonic sensor, imaging device, etc. The mobile device 114 may share information related to the found empty spaces with the processing server 102, via the network 112. The processing server 102 may process the information related to the found empty spaces using predefined parameters, and determine one or more of vacant parking spots and navigable gaps between parked vehicles in the parking facility.

For instance, the vacant parking spots may be identified when large empty space is encountered, and that empty space may correspond to known parking spot as detailed in a navigation map of the parking facility. The navigable gaps, as defined herein, are gaps between two parked vehicles large enough for a user to pass through with ease. The navigable gaps comprise gaps at least equal to a threshold distance between parked vehicles in the parking facility. The threshold distance is equal to minimum space required for the user to egress therethrough. The threshold distance may be varied based on the requirements of the user. For instance, if it is determined that the user is carrying/pushing a baby stroller or the like through the parking facility, the threshold distance may be dynamically updated (i.e., increased to accommodate for extra space needed to pass the said baby stroller). In an exemplary embodiment, the threshold distance is 1.2 meters. It may be understood that the given threshold distance is exemplary only and may be variably coded into the system 100, as required.

Conventionally, a navigation system may provide route guidance to a user, such as a driver, from an origin, which may be the current location of a vehicle, to a destination. Conventional route guidance will provide guidance from the origin to a location as close as possible to the final destination. However, the final destination may not be accessible by vehicle, such as when the final destination is a store within a shopping mall, or when the final destination is a venue such as an airport, sports stadium, concert hall, or the like. Further, when a destination is within a dense urban setting, parking is often not available at the address of a destination, and parking must be found elsewhere.

FIG. 3 illustrates an exemplary user interface depicting a navigation map of an exemplary parking facility 300 as per prior art. As illustrated in FIG. 3, the parking facility 300 may include multiple entry lanes 302 and multiple exit lanes 304. The entry lanes 302 and exit lanes 304 are generally located at corners of the parking facility 300. The parking facility 300 also includes driving lanes 306 that can be used for a vehicle to drive thereon. The parking facility 300 also includes a plurality of parking spots 308. The parking facility 300 also includes access points 310 to allow the user to move out from the parking facility towards the final destination thereof. As depicted, the driving lanes 306 may separate the parking spots 308 from the access points 310. Further, FIG. 3 illustrates the various paths 312 that may be taken by the user to move from the parking spot of the user's vehicle to the access point. It may be seen that the taken paths 312 generally pass through the driving lanes 306 in the parking facility 300. Therefore, the user may have to walk through the driving lanes in the parking facility to reach the desired access point. Due to lack of any pedestrian crossings in the parking facility, the drivers of the vehicles on the driving lanes do not know if there is a need to stop or slow down to let a person cross the driving lane. Thus, the act of walking through the driving lanes could prove to be dangerous, or even fatal in some cases.

Embodiments described herein recognize the lack of available parking at a final destination, and find suitable parking facilities proximate the final destination to provide a better user experience when using the embodiments described herein. Upon the user's vehicle reaching the parking facility and entering the parking facility, embodiments described herein may begin to provide an indication of one or more suitable parking spots and suitable access points, as well as provide an indication of a safe and quick path from the parking spot to the suitable access point, for providing best route to the final destination to the user.

FIG. 4 illustrates an exemplary embodiment of the user interface 208 showing map of a parking facility 400. The illustrated parking facility 400 is shown to be simplified for better understanding of the embodiments of the present disclosure. It may be contemplated by a person skilled in the art that the teachings explained in reference to the parking facility 400 of FIG. 4 may also be applied or scaled for larger parking facilities, like the parking facility 300 of FIG. 3. As illustrated in FIG. 4, the parking facility 400 may include multiple entry lanes 402 and multiple exit lanes 404. The entry lanes 402 and exit lanes 404 are generally located at corners of the parking facility 400. The parking facility 400 also includes driving lanes 406 which can be used for a vehicle to drive thereon. The parking facility 400 includes a plurality of parking spots 408 with some of them occupied by parked vehicles 409. The parking spots 408 are generally arranged adjacent to each other in a grid form; however, in alternate examples, the parking spots 408 may be arranged in any other suitable form without any limitations. The parking spots 408 are designed to have enough width to allow a typical vehicle to be parked therein with ease, while also leaving space for ingress and egress for driver and passengers (if any) of the vehicle. Some of the parking spots 408 are unoccupied and have been labelled as vacant parking spots 408a. It may be seen that some of the parking spots 408 although unoccupied may be partially occupied by vehicle parked in the adjacent parking spot 408, and thus may not be suitable for parking of any other vehicle. The parking facility 400 also includes access points 410 to allow the user to move out from the parking facility towards the final destination thereof. The final destination may include, but not limited to, a store in a shopping mall, an entrance to a venue, etc. In the present embodiments, the access point 410 is a pedestrian access. The pedestrian access may include at least one of: one or more stairs, an elevator, an escalator, a moving walkway, an accessible ramp, or an access controlled portal.

In some examples, the user interface 208 may provide an indication of a type of pedestrian access at the access point 410 for information of the user. For example, in the user interface, the different types of pedestrian access points may be differentiated by using icons, reflecting the type of pedestrian access available at any particular access point. This feature may be beneficial to illustrate a type of pedestrian access which may be prohibitive to certain users. For instance, a person in a wheel chair or a person who cannot easily climb stairs may be averse to a stairway type of pedestrian access and may avoid such a pedestrian access point.

Embodiments described herein provide a computed view that enables a user, such as a driver to easily navigate the parking facility 400 by reducing the cognitive load associated with driving in an unfamiliar parking environment. By using the final destination of the journey as the central criteria for decision making, the system 100 help a user to find a suitable vacant parking spot in the parking facility. The system 100 further suggests a suitable access point in the parking facility. Further, in an embodiment, the system 100 of the present disclosure further suggest a suitable path to safely and quickly navigate from the parking spot to the access point in the parking facility. The visual presentation of a graphical user interface element may provide a readily understandable visual overview of the suitable parking spot and the suitable access point, as well as the determined path, proximate the vehicle in relation to the actual final destination.

For this purpose, the system 100 is configured for generating dynamic paths to guide a user in the parking facility 400. To start with, the system 100 identifies the access point 410 in the parking facility suitable to be utilized by the user. The suitable access point is defined as the access point suitable to be utilized by the user for reaching the final destination from the parking facility. For this purpose, the system 100 first receives information about a final destination of the user. As discussed earlier, the final destination of the user may be a store in a shopping mall. In that case, the suitable access point may be a pedestrian access which provides the shortest route to the final destination from the parking facility. In the illustrated embodiment, although only one access point 410 is shown for the sake of simplicity, it may be understood that in other examples the parking facility 400 may have more than one access points and the system 100 selects the suitable access point from the multiple access points using the parameters as discussed herein. In some examples, the system 100 also takes into consideration the user defined preferences for types of pedestrian access (as discussed above). It may be appreciated that the system 100 may implement the available navigation map of the parking facility 400 for the said purpose, where the navigation map may be received from a cloud database of the venue via the communications interface 206. In some examples, the system 100 may even select a suitable entry lane 402 to be used to enter the parking facility 400 based on the proximity to the determined suitable access point 410.

Subsequently, as illustrated in FIG. 4, when the user's vehicle 412, with the mobile device 114, approaches the entry lane 402 of the parking facility 400, the system 100 is configured to determine a suitable vacant parking spot 408b for the vehicle 412 from the vacant parking spots 408a. As noted earlier, the system 100 receives data related to one or more of vacant parking spots 408a in the parking facility 400, using the one or more sensors of the mobile device 114. Herein, the suitable vacant parking spot 408b is generally defined as the vacant parking spot closest to the suitable access point 410. Specifically, the suitable vacant parking spot 408b may be defined as the vacant parking spot which provides quickest route to the access point 410 passing through other vacant parking spots and navigable gaps in the parking facility 400 (as discussed in the subsequent paragraphs), if needed. Thereafter, the system 100 determines a suitable route 414 for the vehicle 412 to traverse through the parking facility 400 in order to reach the suitable vacant parking spot 408b, as determined.

It may be understood that when the user moves from a road network to the parking facility 400, the user interface 206 may continue to guide a user into the parking facility 400, while transitioning from an illustration of a map of a road network to a map of the parking facility 400. While the positioning mechanism used outside of the parking facility or "positioning system" may cease to properly function upon entering the parking facility (e.g., GPS), an alternative mechanism may be implemented for tracking location within the parking facility or a "tracking system", such as inertial measurement, access point signal fingerprinting, dead reckoning, or the like. While the user interface may provide route guidance to a user based on the location of the user according to the positioning system, upon reaching a parking facility with poor or limited access to the positioning system signals, the navigation system may transition to use of the tracking system. This transition may appear seamless to a user as the user interface continues to depict the position of a user/vehicle as the vehicle approaches the parking facility and subsequently enters the parking facility. The map provided for display during route guidance depicting a network of roads may transition to a route guidance system depicting the layout of the parking facility, with the location of the user depicted on the display of the user interface 208 in an easily understood manner.

In an embodiment of the present disclosure, the route 414 to be traversed by the vehicle 412 of the user in the parking facility 400 for reaching the selected suitable vacant parking spot 408b is such that the vehicle 412 traverses through the parking facility 400 in order to collect required data related to one or more of vacant parking spots 408a and navigable gaps 416 between parked vehicles 409. For this purpose, as noted earlier, the vehicle 412 may be provided with the mobile device 114 having the one or more sensors configured to determine empty spaces proximal thereto. In such case, the determined route 414 would not be the most direct route from the entry lane 402 to the parking spot 408b. In certain cases, the user of the vehicle may be incentivized to select this route rather than the shortest route. The incentives could be in the form of getting a personalized map of the parking facility 400 and/or in the form of one or more of reward points, discounts, coupons or parking fee rebate, etc.

FIG. 5 depicts the route 414 to be taken by the vehicle 412 in the parking facility 400 so as to scan all around for empty parking spots and spaces between vehicles which could be used for reaching the access point 410. FIG. 5 also depicts the found vacant parking spots 408a and navigable gaps 416 between parked vehicles 409. The system 100 may be configured to even determine width of the available spaces through the vacant parking spots 408a and the navigable gaps 416, using the sensors of the mobile device 114.

As illustrated in FIG. 6, based on the information about the found vacant parking spots 408a and navigable gaps 416, the system 100 determines one or more paths 418 to be traversed by the user for reaching the access point 410. That is, the system 100 would use the sensory input, combined with some possibly existing static parking map information, to generate the best pedestrian path from the parked position 408b to the access point 410. The system 100 could provide a dynamic route computation that uses those shortcuts through the found vacant parking spots 408a and navigable gaps 416 for determining quick and safe paths 418. In the embodiment of FIG. 6, the determined paths 418 are pedestrian paths to guide the user to walk on foot from the parking spot 408b of his/her vehicle to the access point 410. In one embodiment, the system 100 selects one path 418a which is most suitable for reaching the access point 410. In one example, the selected path 418a is the path 418 which provides the shortest route to the access point 410.

Additionally, or alternatively, the selected path 418a is based on the probability of one or more vacant parking spots in the determined path 418 to remain vacant for a period of time. The period of time is based, at least in part, on approximate time to be taken by the user for traversing the determined path 418. It may be understood that the probability of one or more vacant parking spots in the determined path 418 to remain vacant is being taken into consideration in order to eliminate possibility of the user passing though one of the vacant parking spots in the determined path 418 and another vehicle coming from other end to block the user's path, or worse collide with the user. Thus, the system 100 of the present disclosure provides a safe pedestrian path for the user to traverse through the parking facility 400 in order to reach the suitable access point for, ultimately, reaching the user's desired final destination.

In one example, the probability of one or more vacant parking spots in the determined path 418 to remain vacant for a period of time is based on the flow of vehicles through one or more entry lanes 402 and the exit lanes 404 of the parking facility 400. It may be contemplated that the data about the dynamic flow of vehicles may be received from one or more motion sensors or the like installed at the entry lanes 402 and the exit lanes 404. Further, in one example, the probability of one or more vacant parking spots in the determined path 418 to remain vacant for a period of time is based on the number and locations of vehicles already present in the parking facility 400 and trying to find suitable parking space in one or more vacant parking spots. Again, it may be contemplated that such data may be calculated based on the difference between the number of vehicles that have entered the parking facility and the number of vehicles that have exited the parking facility combined with the number of vehicles already parked therein. More techniques for collecting and/or computing such information are well known in the art, and thus have not been described herein for the brevity of the present disclosure.

Finally, the system 100 share the determined path 418a with the user via the user interface 208. As noted earlier, the user interface 208 may be a display screen. In such case, the system 100 plots the determined path 418a on the map of the parking facility 400 being displayed on the user interface 208. In other examples, in which the user interface 208 may be an audio device, the user interface 208 may narrate the directions corresponding to the determined path 418a to the user. Since, the parked vehicles 409 are closely packed in the parking facility 400, sometimes it may get difficult for the user to understand direction markers, especially when the markers correspond to navigable spaces 416 between the parked vehicles 409. In one embodiment, the system 100 may employ image recognition and machine learning to identify models of the various parked vehicles 409 in the parking facility 400. In such case, the system 100 may be able to better guide the user by providing more specific instructions, such as "turn right between the Audi Q7 and the blue BMW 5," and the like.

In some embodiments, the system 100 may be configured for managing the parking facility. Herein, the system 100 further instructs one or more vehicles in the parking facility to park so as to leave gaps therebetween, such that the gaps are at least equal to the threshold distance in order to be utilized as navigable gaps. For example, in such case, the vehicles may be autonomous or semi-autonomous vehicles with at least the capability to park on its own. In other examples, the system 100 may instruct the users of the vehicles in the parking facility to park so as to leave gaps therebetween, such that the gaps are at least equal to the threshold distance in order to be utilized as navigable gaps. Thus, the system 100 instructs the vehicles to actively leave enough gap on one side by parking tightly and closer to one of the sides of the parking spot when possible to order to facilitate a path for pedestrians.

The system 100 may achieve this by first receiving data related to navigable gaps between parked vehicles in the parking facility (as discussed in the preceding paragraphs). The system 100 determines if number of navigable gaps in the parking facility is below a predefined first margin and/or if distribution of navigable gaps in the parking facility is below a predefined second margin. It may be contemplated that the first and second margins may be predefined and coded into the system 100 based on the size and occupancy rate of the parking facility. The system 100 may then instruct one or more vehicles in the parking facility to park leaving gaps at least equal to a threshold distance in order to be utilized as navigable gaps, in case one or more of the number of navigable gaps in the parking facility is below the predefined first margin and if distribution of navigable gaps in the parking facility is below the predefined second margin.

In order to receive sufficient data related to navigable gaps between parked vehicles in the parking facility, the system 100 may include one or more sensors installed in the parking facility, wherein the one or more sensors are configured to identify navigable gaps in the parking facility. These sensors may include cameras complemented with image recognition, RADAR, LIDAR, etc. Additionally, or alternatively, the system 100 may include a vehicle provided with one or more sensors configured to identify vacant parking spots and navigable gaps proximal thereto. The system 100 may, then, determine a route to be traversed by the vehicle in the parking facility to maximize collection of the data related to navigable gaps between parked vehicles. Thereafter, the system 100 may instruct the vehicle to traverse on the determined route for start collecting the said data.

FIG. 7 illustrates a flowchart 700 depicting a method for generating dynamic paths to guide a user in a parking facility. At step 702, the method includes identifying an access point in the parking facility suitable to be utilized by the user. As discussed, identifying the access point may include receiving information about a final destination of the user, and determining the access point suitable to be utilized by the user for reaching the final destination from the parking facility. Additionally, or alternatively, the access point may be identified based on user defined preferences for types of pedestrian access. At step 704, the method includes receiving data related to one or more of gaps between parked vehicles in the parking facility. The method may further include determining one or more of vacant parking spots and navigable gaps between parked vehicles based on data related to gaps in the parking facility. In one or more examples, receiving data may include determining a route to be traversed by the vehicle of the user in the parking facility for reaching a suitable vacant parking spot such that the vehicle traverses through the parking facility in order to collect required data related to gaps between parked vehicles. At step 706, the method includes determining a path to be traversed by the user for reaching the access point. The determined path, when traversed, includes navigating through one or more of the vacant parking spots and the navigable gaps between parked vehicles. At step 708, the method includes providing the determined path to the user via the user interface.

According to an embodiment of the present disclosure, a system to manage the parking facility 400 may also be provided. For instance, in an example, when the parking facility 400 may not have enough navigable gaps 416, then the system 100 may adjust one or more parked vehicles 409 to move and park so as to create enough gaps which can be utilized as navigable gaps. Thereafter, the created navigable gaps may be utilized by the system 100 in determination of the paths 418 for the user to reach the access point 410. It may be understood that the system 100 may adjust the parked vehicles 409 by instructing the one or more vehicles in the parking facility to park leaving gaps at least equal to the threshold distance. The system 100 may only carry out such process when the number of navigable gaps and/or the distribution of navigable gaps in the parking facility 400 may not be sufficient to determine a proper path 418 (as discussed in the preceding paragraphs).

In an embodiment, the system 100 instructs one or more vehicles in the parking facility to park leaving gaps at least equal to the threshold distance, in case one or more of the number of navigable gaps in the parking facility is below the predefined first margin and if distribution of navigable gaps in the parking facility is below the predefined second margin. The first margin and the second margin may be predefined based on the minimum number and distribution of the navigable gaps required in the parking facility in order to determine the proper path 418, respectively. In the present embodiments, the instructions may include request to park close to one of edges of corresponding parking spot. This would leave space near the other of the two edges which could be utilized as navigable gap in the parking facility 400. In one example, the system 100 instructs one or more autonomous vehicles to park close to one of edges of corresponding parking spot. In other example, the system instructs drivers of one or more vehicles to park close to one of edges of corresponding parking spot via the user interface, such as the user interface 208. In some example embodiments, this may be done based on additional information received related to occupants in the vehicle, the information including, but not limited to, number of occupants, age of occupants, luggage being carried by the occupants in the vehicle, etc.

Further, as noted earlier, in order to receive sufficient data related to navigable gaps between parked vehicles in the parking facility, the system 100 may include one or more sensors installed in the parking facility, wherein the one or more sensors are configured to identify navigable gaps in the parking facility. Additionally, or alternatively, the system 100 may include a vehicle provided with one or more sensors configured to identify vacant parking spots and navigable gaps proximal thereto. The system 100 may then determine a route to be traversed by the vehicle in the parking facility to maximize collection of the data related to navigable gaps between parked vehicles. Thereafter, the system 100 may instruct the vehicle to traverse on the determined route for start collecting the said data.

FIG. 8 illustrates a flowchart 800 depicting a method for managing a parking facility. At step 802, the method includes receiving data related to navigable gaps between parked vehicles in the parking facility. As noted earlier, the navigable gaps may be determined by providing a vehicle with one or more sensors to identify vacant parking spots and navigable gaps proximal thereto and determining a route to be traversed by the vehicle in the parking facility to maximize collection of the data related to navigable gaps between parked vehicles; and then traversing the vehicle on the determined route. At step 804, the method includes determining if number of navigable gaps in the parking facility is below a predefined first margin. The first margin may be predefined based on the minimum number of the navigable gaps required in the parking facility in order to determine the proper path. At step 806, the method includes determining if distribution of navigable gaps in the parking facility is below a predefined second margin. The second margin may be predefined based on the required distribution of the navigable gaps in the parking facility in order to determine the proper path.

At step 808, the method includes instructing one or more vehicles in the parking facility to park so as to leave gaps therebetween, in case one or more of the number of navigable gaps in the parking facility is below the predefined first margin and if distribution of navigable gaps in the parking facility is below the predefined second margin. The gaps are at least equal to a threshold distance in order to be utilized as navigable gaps. Providing instructions to vehicles may include instruct one or more autonomous vehicles to park close to one of edges of corresponding parking spot and/or instruct drivers of one or more vehicles to park close to one of edges of corresponding parking spot. This would leave space near the other of the two edges which could be utilized as navigable gap in the parking facility 400. In one example, the instructions include guiding one or more autonomous vehicles to park close to one of edges of corresponding parking spot. In other example, the instructions include guiding drivers of one or more vehicles to park close to one of edges of corresponding parking spot via a user interface. In some example embodiments, this may be done based on additional information received related to occupants in the vehicle, the information including, but not limited to, number of occupants, age of occupants, luggage being carried by the occupants in the vehicle, etc.

FIG. 9 illustrates a flowchart 900 depicting a method for managing a parking facility. At step 902, the method includes determining a path to be traversed by a user to reach one or more access points in the parking facility. The determined path is such that, when traversed, comprises navigating through gaps between parked vehicles. As noted earlier, the gaps may be determined by providing a vehicle with one or more sensors to identify vacant parking spots and gaps between parked vehicles proximal thereto and determining a route to be traversed by the vehicle in the parking facility to maximize collection of the data; and then traversing the vehicle on the determined route. At step 904, the method includes determining, if in the determined path, one or more gaps have distance between parked vehicles smaller than a threshold distance. The threshold distance is equal to minimum space required for the user to egress therethrough. The threshold distance may be varied based on the requirements of the user. For instance, if it is determined that the user is carrying/pushing a baby stroller or the like through the parking facility, the threshold distance may be dynamically updated (i.e., increased to accommodate for extra space needed to pass the said baby stroller).

At step 906, the method includes instructing one or more vehicles corresponding to the one or more gaps with smaller than a threshold distance to park leaving gaps at least equal to the threshold distance. Providing instructions to vehicles may include instruct one or more autonomous vehicles to park close to one of edges of corresponding parking spot and/or instruct drivers of one or more vehicles to park close to one of edges of corresponding parking spot. This would leave space near the other of the two edges which could be utilized as navigable gap in the parking facility 400. In one example, the instructions include guiding one or more autonomous vehicles to park close to one of edges of corresponding parking spot. In other example, the instructions include guiding drivers of one or more vehicles to park close to one of edges of corresponding parking spot via a user interface. In some example embodiments, this may be done based on additional information received related to occupants in the vehicle, the information including, but not limited to, number of occupants, age of occupants, luggage being carried by the occupants in the vehicle, etc.

It may be understood that the method, system and computer program product of the present disclosure may be implemented to help the user to navigate through the entire journey to the final destination thereof. For instance, the system 100 may guide the user from, say, the user's home to the parking facility of the final destination using conventional navigation techniques known in the art. Once the vehicle of the user reaches the parking facility, the system 100 helps the user to identify suitable access point to reach the final destination, and suitable parking spot in proximity to the access point. Further, the system 100 helps the user to safely navigate the parking facility on foot to reach the access point from the parking spot. The system 100 plots path to be traversed by the user for reaching the access point, wherein the determined path, when traversed, comprises navigating through one or more of the vacant parking spots and the navigable gaps between parked vehicles. The determined path ensures that the user has minimum exposure to the driving lanes which provides safety to the user.

Thus, the method, system and computer program product of the present disclosure provide more dynamic and accurate pedestrian routing in parking facilities, like parking garages in a shopping mall, hospitals, offices, and the like. The method, system and computer program product of the present disclosure leverage dynamic information and sensors installed in the vehicle itself and does not warrant or require additional infrastructure to be installed in the parking facility for achieving the said purpose.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for guiding a user in a parking facility, the method comprising:
    receiving, by a processor, data related to gaps between parked vehicles in the parking facility, wherein the data is received from one or more vehicles traversing through the parking facility;
    determining, by the processor, a path to be traversed by the user to reach one or more access points, wherein the determined path, when traversed, comprises navigating through the gaps between parked vehicles; and
    providing, by the processor, data of the determined path to a user interface.

2. The method of claim 1 further comprising:
    determining one or more of vacant parking spots and navigable gaps between parked vehicles based on data related to gaps in the parking facility, wherein the determined path, when traversed, comprises navigating through the one or more of vacant parking spots and navigable gaps between parked vehicles.

3. The method of claim 2, wherein the navigable gaps comprise gaps at least equal to a threshold distance between parked vehicles in the parking facility, and wherein the threshold distance is equal to minimum space required for the user to egress therethrough.

4. The method of claim 1, further comprising identifying the one or more access points, wherein identifying the one or more access points comprises:
    receiving information about a final destination of the user; and
    determining the access point suitable to be utilized by the user for reaching the final destination from the parking facility.

5. The method of claim 1 further comprising:
    identifying the one or more access points based, at least in part, on user defined preferences for types of pedestrian access.

6. The method of claim 1 further comprising:
    determining a route to be traversed by the vehicle of the user in the parking facility for reaching a suitable vacant parking spot, wherein the determined route is not the most direct route.

7. The method of claim 2 further comprising:
    determining a probability of one or more vacant parking spots in the determined path to remain vacant for a period of time, wherein the period of time is based, at least in part, on approximate time to be taken by the user for traversing the determined path.

8. The method of claim 7, wherein the probability of one or more vacant parking spots in the determined path to remain vacant for a period of time is based on the flow of vehicles through one or more entries and exits of the parking facility.

9. The method of claim 7, wherein the probability of one or more vacant parking spots in the determined path to remain vacant for a period of time is based on the number and locations of vehicles in the parking facility trying to park in one or more vacant parking spots.

10. The method of claim 3 further comprising instructing one or more vehicles in the parking facility to park leaving gaps at least equal to the threshold distance.

11. A system for guiding a user in a parking facility, and comprising at least one processor and at least one non-transitory memory including computer program code instructions, the computer program code instructions configured to, when executed, cause the system to at least:
    receive, by the processor, data related to gaps between parked vehicles in the parking facility, wherein the data is received from one or more vehicles traversing through the parking facility;
    determine, by the processor, a path to be traversed by the user to reach one or more access points, wherein the determined path, when traversed, comprises navigating through the gaps between parked vehicles; and
    provide, by the processor, data of the determined path to a user interface.

12. The system of claim 11, wherein the system is further configured to:
    determining one or more of vacant parking spots and navigable gaps between parked vehicles based on data related to gaps in the parking facility, wherein the determined path, when traversed, comprises navigating through the one or more of vacant parking spots and navigable gaps between parked vehicles.

13. The system of claim 12, wherein the navigable gaps comprise gaps at least equal to a threshold distance between parked vehicles in the parking facility, and wherein the threshold distance is equal to minimum space required for the user to egress therethrough.

14. The system of claim 11, wherein the system is further configured to identify the one or more access points, wherein identifying the one or more access points comprises:
    receiving information about a final destination of the user; and
    determining the access point suitable to be utilized by the user for reaching the final destination from the parking facility.

15. The system of claim 11, wherein the system is further configured to identify the one or more access points based, at least in part, on user defined preferences for types of pedestrian access.

16. The system of claim 11, wherein receiving data related to gaps between parked vehicles comprises:
    determining a route to be traversed by the vehicle of the user in the parking facility for reaching a suitable vacant parking spot, wherein the determined route is not the most direct route.

17. The system of claim 12, wherein the system is further configured to:
    determine a probability of one or more vacant parking spots in the determined path to remain vacant for a period of time, wherein the period of time is based, at least in part, on approximate time to be taken by the user for traversing the determined path.

18. The system of claim 17, wherein the probability of one or more vacant parking spots in the determined path to remain vacant for a period of time is based on the flow of vehicles through one or more entries and exits of the parking facility.

19. The system of claim 17, wherein the probability of one or more vacant parking spots in the determined path to remain vacant for a period of time is based on the number and locations of vehicles in the parking facility trying to park in one or more vacant parking spots.

20. A computer program product comprising at least one non-transitory computer readable storage medium having computer-executable program code instructions stored therein, the computer-executable program code instructions comprising program code instructions to:

receive data related to one or more of vacant parking spots and navigable gaps between parked vehicles in the parking facility, wherein the data is received from one or more vehicles traversing through the parking facility;

determine a path to be traversed by the user for reaching one or more access points, wherein the determined path, when traversed, comprises navigating through one or more of the vacant parking spots and the navigable gaps between parked vehicles; and provide the determined path to a user interface.

* * * * *